(12) United States Patent
Giovanardi et al.

(10) Patent No.: US 12,518,751 B2
(45) Date of Patent: Jan. 6, 2026

(54) EXTRACTING ENGAGING QUESTIONS FROM A COMMUNICATION SESSION

(71) Applicant: Zoom Communications, Inc., San Jose, CA (US)

(72) Inventors: Davide Giovanardi, Saratoga, CA (US); Vijay Parthasarathy, San Jose, CA (US); Xiaoli Song, Redding, CA (US); Peng Su, Shoreline, WA (US); Junqing Wang, Hangzhou (CN)

(73) Assignee: Zoom Communications, Inc., San Jose, CA (US)

(*) Notice: Subject to any disclaimer, the term of this patent is extended or adjusted under 35 U.S.C. 154(b) by 346 days.

(21) Appl. No.: 17/589,829

(22) Filed: Jan. 31, 2022

(65) Prior Publication Data

US 2023/0230589 A1    Jul. 20, 2023

(30) Foreign Application Priority Data

Jan. 20, 2022  (CN) .......................... 202220158740.8

(51) Int. Cl.
| | | |
|---|---|---|
| *G06F 40/117* | (2020.01) | |
| *G06F 40/166* | (2020.01) | |
| *G06F 40/211* | (2020.01) | |
| *G06F 40/253* | (2020.01) | |
| *G06F 40/284* | (2020.01) | |
| *G10L 15/02* | (2006.01) | |

(Continued)

(52) U.S. Cl.
CPC ............ *G10L 15/22* (2013.01); *G06F 40/117* (2020.01); *G06F 40/166* (2020.01); *G06F 40/211* (2020.01); *G06F 40/253* (2020.01); *G06F 40/284* (2020.01); *G10L 15/02* (2013.01); *G10L 15/063* (2013.01); *G10L 25/57* (2013.01)

(58) Field of Classification Search
CPC ....... G10L 15/22; G10L 15/02; G10L 15/063; G10L 25/57; G06F 40/117; G06F 40/166; G06F 40/211; G06F 40/253; G06F 40/284; G06F 40/279; G06F 40/30; G06F 40/35
See application file for complete search history.

(56) References Cited

U.S. PATENT DOCUMENTS 10,133,724 B2 * 11/2018 Bethard .................. G06F 16/35
10,553,208 B2 *  2/2020 Nelson .................... G10L 15/22
(Continued)

*Primary Examiner* — Pierre Louis Desir
*Assistant Examiner* — Kristen Michelle Masters
(74) *Attorney, Agent, or Firm* — Young Basile Hanlon & MacFarlane, P.C.

(57) ABSTRACT

Methods and systems provide for extracting engaging questions from a communication session. In one embodiment, the system connects to a communication session with a number of participants; receives a transcript of a conversation between the participants produced during the communication session; extracts, from the transcript, utterances including one or more sentences spoken by the participants; identifies a subset of the utterances spoken by a subset of the participants associated with a prespecified organization; extracts engaging questions within the subset of utterances, the engaging questions each including a question asked by the participant associated with the organization that is immediately answered in the following utterance by a participant not associated with the organization; and presents, for display at one or more client devices, data corresponding to the extracted engaging questions.

19 Claims, 8 Drawing Sheets

(51) Int. Cl.
    *G10L 15/06*     (2013.01)
    *G10L 15/22*     (2006.01)
    *G10L 25/57*     (2013.01)

(56) References Cited

U.S. PATENT DOCUMENTS

| | | | |
|---|---|---|---|
| 2014/0068463 A1* | 3/2014 | Kay | H04L 12/1822 715/753 |
| 2017/0293677 A1* | 10/2017 | Boguraev | G06F 16/24578 |
| 2019/0108834 A1* | 4/2019 | Nelson | G06N 5/04 |
| 2023/0025842 A1* | 1/2023 | Nandikotkur | H04L 12/1818 |
| 2023/0113421 A1* | 4/2023 | Kaleko | G06F 40/205 704/9 |

* cited by examiner

FIG. 4

| 6 | Are you looking at using the licenses, primarily? |
| --- | --- |
| 7 | For like small group meetings, education type events? |
| 8 | Like what what does the used case for all? |
| 9 | How many actual like, full time employees do you guys have? |
| 10 | and then you choose who to assign the licenses to, right? |
| 11 | If you get a webinar 500 license, then whoever has that webinar license can schedule a webinar for up to 500 participants, right? |
| 12 | Any questions on any of that? |
| 13 | I don't know what you guys' current standing is but who would at least with your employees, who do you guys use for your phone systems? |
| 14 | You guys use a cloud phone? |
| 15 | You guys send out like like stipends for those? |
| 16 | Or is everyone just responsible? |
| 17 | So basically you said you're looking at 10 meeting licenses and then a webinar 5 hundred? |
| 18 | So we want up to 500 attendees? |
| 19 | It could take maybe a day, maybe 2 once they're provision, do you want to walk you a quick training? |
| 20 | Are you pretty comfortable with everything? |
| 21 | Do you wanna do you want to put on the calendar then for Friday and we can add all the users and everything together? |

EXTRACTING ENGAGING QUESTIONS FROM A COMMUNICATION SESSION

FIELD OF INVENTION

The present invention relates generally to digital communication, and more particularly, to systems and methods for extracting engaging questions from a communication session.

SUMMARY

The appended claims may serve as a summary of this application.

BRIEF DESCRIPTION OF THE DRAWINGS

The present invention relates generally to digital communication, and more particularly, to systems and methods providing for extracting engaging questions from a communication session.

The present disclosure will become better understood from the detailed description and the drawings, wherein:

FIG. 4 is a diagram illustrating one example embodiment of a user interface for presenting data on engaging questions for a conversation.

FIG. 5 is a diagram illustrating examples of engaging questions extracted from a transcript for a conversation.

FIG. 6 is a diagram illustrating one example embodiment of a user interface presenting highlighted sections of engaging questions within a transcript of a conversation.

DETAILED DESCRIPTION

Figure 1A:
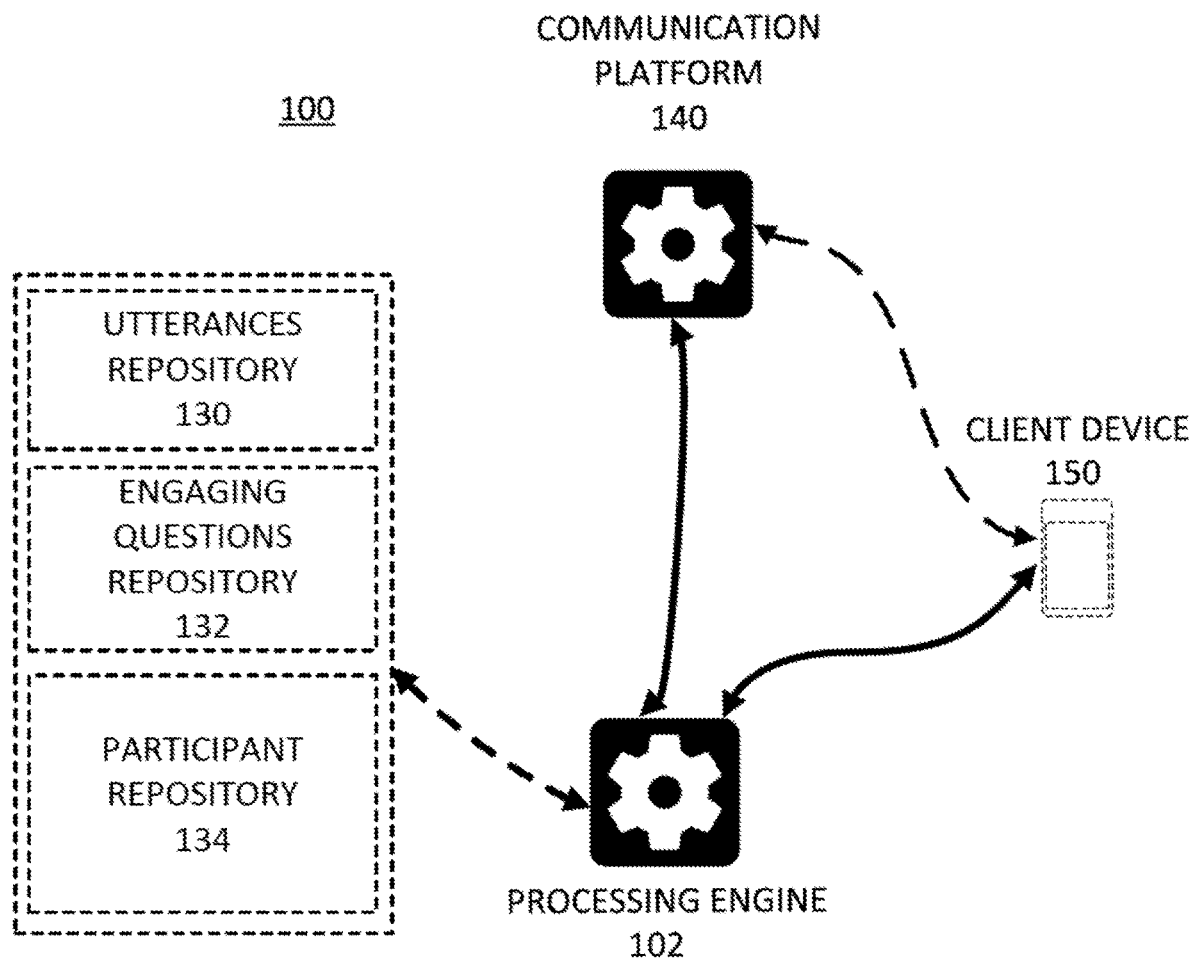
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

One such use case which is currently lacking includes analytics data and metrics around whether and to what extent team members are asking "engaging questions" in a meeting with a prospective customer. Engaging questions refer to a participant in a conversation asking a question that is immediately responded to with an answer in the following utterance. In the example of a sales meeting, an engaging question would be a question asked by a sales representative, which is then followed up by an answer from a prospective customer. A question asked by a sales representative that is not responded to be a customer would not be engaging. Similarly, a question in form only that does not contain any interrogative words—such as, e.g., "who", "what", "when", "where", and "how"—which must be responded to would not be engaging. It would be highly valuable for sales representatives within a sales team, for example, to ask a sufficient number of engaging questions during a conversation with a prospective customer, in order to maximize customer engagement and lead to more successful sales performance.

Thus, there is a need in the field of digital communication tools and platforms to create a new and useful system and method for extracting engaging questions within a communication session and presenting data relating to these engaging questions. The source of the problem, as discovered by the inventors, is a lack of useful meeting intelligence and analytics data provided to members of an organization with respect to remote communication sessions.

In one embodiment, the system connects to a communication session with a number of participants; receives a transcript of a conversation between the participants produced during the communication session; extracts, from the transcript, utterances including one or more sentences spoken by the participants; identifies a subset of the utterances spoken by a subset of the participants associated with a prespecified organization; extracts engaging questions within the subset of utterances, the engaging questions each including a question asked by the participant associated with the organization that is immediately answered in the following utterance by a participant not associated with the organization; and presents, for display at one or more client devices, data corresponding to the extracted engaging questions.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the system 100, a client device 150 is connected to a processing engine 102 and, optionally, a communication platform 140. The processing engine 102 is connected to the communication platform 140, and optionally connected to one or more repositories and/or databases, including, e.g., an utterances repository 130, engaging questions repository 132, and/or a participant repository 134. One or more of the databases may be combined or split into multiple databases. The client device 150 in this environment may be a computer, and the communication platform 140 and processing engine 102 may be applications or software hosted on a computer or multiple computers which are communicatively coupled via remote server or locally.

The system 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
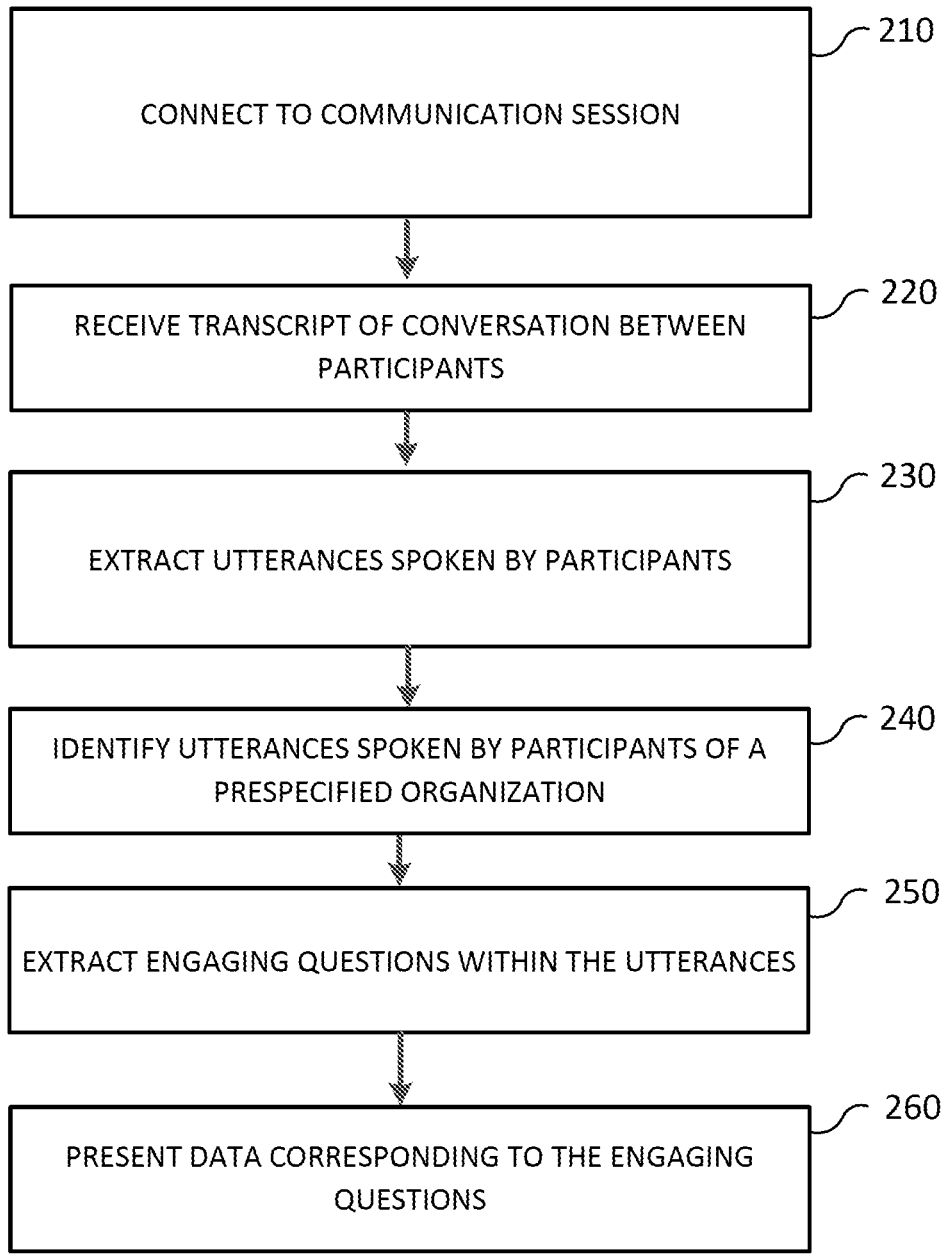
FIG. 2 is a flow chart illustrating an exemplary method that may be performed in some embodiments.

In an embodiment, the processing engine 102 may perform the exemplary method of FIG. 2 or other method herein and, as a result, extract engaging questions from a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the client device 150 is associated with a first user account within a communication platform, and one or more additional client device(s) may be associated with additional user account(s) within the communication platform.

In some embodiments, optional repositories can include an utterances repository 130, engaging questions repository 132, and/or participant repository 134. The optional repositories function to store and/or maintain, respectively, information on utterances within the session; engaging questions which are extracted; and data relating to participants within the communication session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
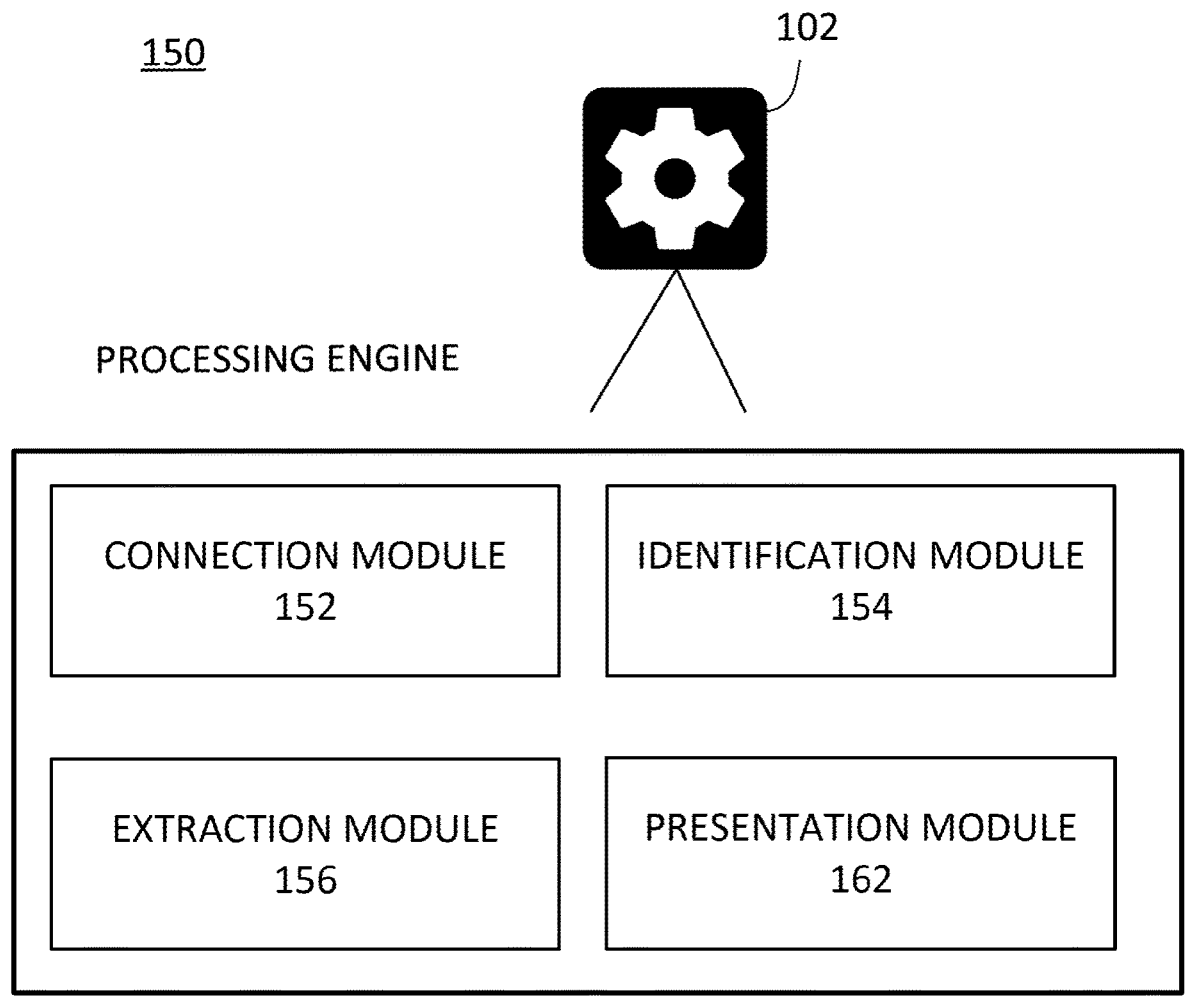
FIG. 1B is a diagram illustrating an exemplary computer system that may execute instructions to perform some of the methods herein.

FIG. 1B is a diagram illustrating an example of a client device 150 with software modules that may execute some of the functionality described herein. In some embodiments, the modules illustrated are components of the processing engine 102.

Connection module 152 functions to connect to a communication session with a number of participants, and receive a transcript of a conversation between the participants produced during the communication session.

Identification module 154 functions to extract, from the transcript, a plurality of utterances each including one or more sentences spoken by the participants, and identify a subset of the utterances spoken by a subset of the participants associated with a prespecified organization.

Extraction module 156 functions to extract engaging questions within the subset of utterances.

Presentation module 162 functions to present, for display on one or more client devices, data corresponding to the extracted engaging questions.

The above modules and their functions will be described in further detail in relation to an exemplary method below.

FIG. 2 is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives a transcript of a conversation between the participants produced during the communication session. That is, the conversation which was produced during the communication is used to generate a transcript. The transcript is either generated by the system, or is generated elsewhere and retrieved by the system for use in the present systems and methods (e.g., the system obtains the transcript). In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session.

At step 230, the system extracts utterances spoken by the participants. Utterances are recognized by the system as one or more sentences attached to a specific speaker of that sentence (i.e., participant). Timestamps, as well as a speaker who uttered the utterance, may be attached to each utterance and/or each sentence. In some embodiments, the transcript itself provides clear demarcation of utterances based on the timestamps which are placed at the start of each utterance. Thus, extracting these utterances may involve extracting the separate utterances which have been demarcated by the timestamps in the transcript.

At step 240, the system identifies a subset of the utterances spoken by a subset of the participants associated with a prespecified organization. In some embodiments, the prespecified organization may be a business entity or company, department, team, organization, or any other suitable organization. In some embodiments, team members may identify themselves and/or one another as members, employees, contractors, or otherwise associated with the organization. In some embodiments, hierarchical relationships between users associated with the organization can be formed due to users explicitly providing such information, via the system implicitly drawing connections based on additional information, or some combination thereof. In some embodiments, a reporting chain of command can be established based on such implicit or explicit hierarchical relationships. In some embodiments, the system identifies that the participant is part of the organization upon the participant logging into the communication platform (e.g., based on credentials). In some embodiments, if the domain of the email address associated with the participant is the same email domain as a known member of an organization, they may be presumed to be associated with the organization as well. In some embodiments, within the context of a sales meeting involving sales representatives and prospective customers, the system can use organizational data to determine which participants are sales representatives and which participants are customers (e.g., a given customer is associated with an organization that none of the sales representatives are associated with).

At step 250, the system extracts one or more engaging questions within the subset of the utterances. The engaging questions each represent a question which is asked by the participant associated with the organization that is immediately answered in the following utterance by a participant not associated with the organization. In some embodiments, extraction of engaging questions includes tagging and parsing of sentences.

In some embodiments, extracting the engaging questions includes identifying a number of linguistic features within each sentence of the utterance, wherein the linguistic features are used to classify the sentence as an engaging question or otherwise. Such linguistic features may comprise one or more of, e.g.: words or tokens, lemmas, parts of speech (POS), detailed POS tags, dependencies (i.e., syntactic dependencies, or the relation between tokens), morphology, word shapes, alpha characters, and/or words in a stop list. In various embodiments, linguistic features may include, e.g., tokenization, named entity recognition, dependency parsing, pre-trained work vectors and similarity, built-in visualizers, or any other suitable features or capabilities of linguistic features analysis.

In some embodiments, the system may determine that one or more sentences include engaging questions based on whether they contain interrogative words, such as, e.g., "who", "what", "when", "where", and "how", and call for more specific information. In some embodiments, engaging questions may be determined by whether they contain polar questions, i.e., yes-or-no questions (e.g., can be answered with a yes or no). Such questions can be answered in the affirmative or the negative, and display subject-verb inversion where the verb must be either an auxiliary (e.g., "did", "do"), a modal (e.g., "will", "can"), or a form of the main verb "be".

In some embodiments, the system extracts engaging questions by removing pseudoclefts as false positives. First, the system determines that one or more words within an utterance constitute a "pseudocleft" in which an interrogative word is used for emphasis rather than interrogation. Pseudoclefts are often described as providing emphasis or "focus" to part of the sentence, in conjunction with an interrogative word, but pseudoclefts are not questions. Thus, such sentences would be classified as false positives if not handled correctly. For example, the sentence "What you say is unbelievable" would be classified as a pseudocleft, since it contains the interrogative word "what" but is not an interrogative question. Next, the system labels the utterance as a false positive which is not to be extracted as an engaging question.

In some embodiments, the system determines that one or more words within an utterance constitute a "pied-piping sentence" with a prepositional dependency relationship between an interrogative word and its syntactic parent. These are sentences which don't start with an interrogative word, yet are still considered interrogative questions in that they can be answered with specific information. For example, the question, "in which article did they talk about the product?" would be considered a pied-piping sentence, because it does not begin with an interrogative word, but it is an interrogative question. In some embodiments, pied-piping can be captured by a prepositional dependency relation between the interrogative word and its head (i.e., the syntactic parent).

At step 260, the system presents, for display at one or more client devices, data corresponding to the extracted engaging questions.

In some embodiments, the data is displayed at one or more client devices which are configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the client devices may be associated with and/or operated by one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on extracted engaging questions if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Figure 3:
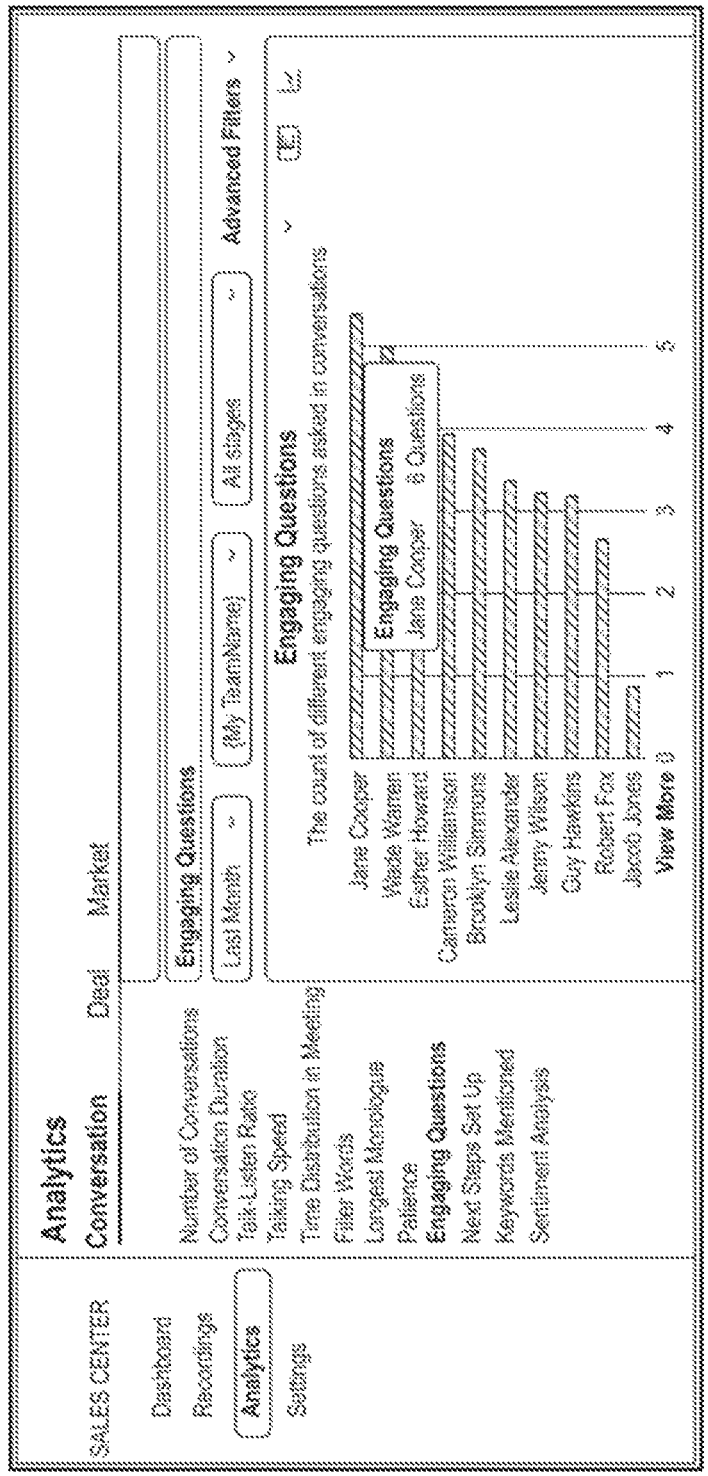
FIG. 3 is a diagram illustrating one example embodiment of a user interface for presenting data related to extracted engaging questions.

Within this displayed UI presented to the one or more client devices, data corresponding to the extracted engaging questions can be displayed. For example, a UI may be shown which displays aggregate analytics data pertaining to a sales team's meetings with clients over multiple conversations and communication sessions. Within this aggregate analytics data, the average number of engaging questions asked during conversations can be displayed with respect to the entire team's performance. In some embodiments, this data is additionally or alternatively displayed for each individual member of a group. An example of such a UI displayed to client device(s) is illustrated in FIG. 3 and described in further detail below. In some embodiments, rather than aggregate analytics data or data shown for all team members, individual and/or customized analytics data for a particular participant can be viewed, including potentially a wide variety of data for that particular individual.

Figure 4:
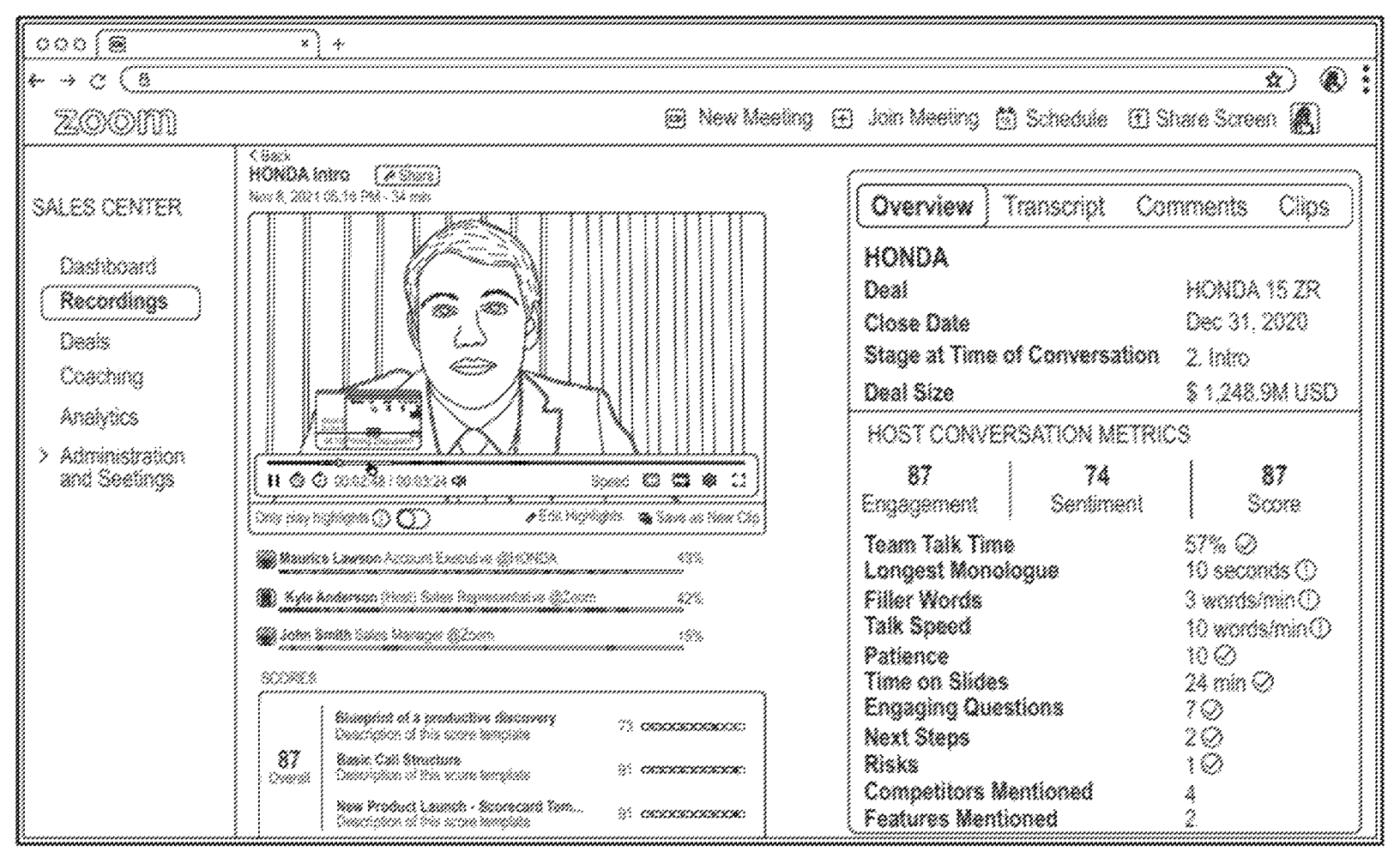
Figure 6:
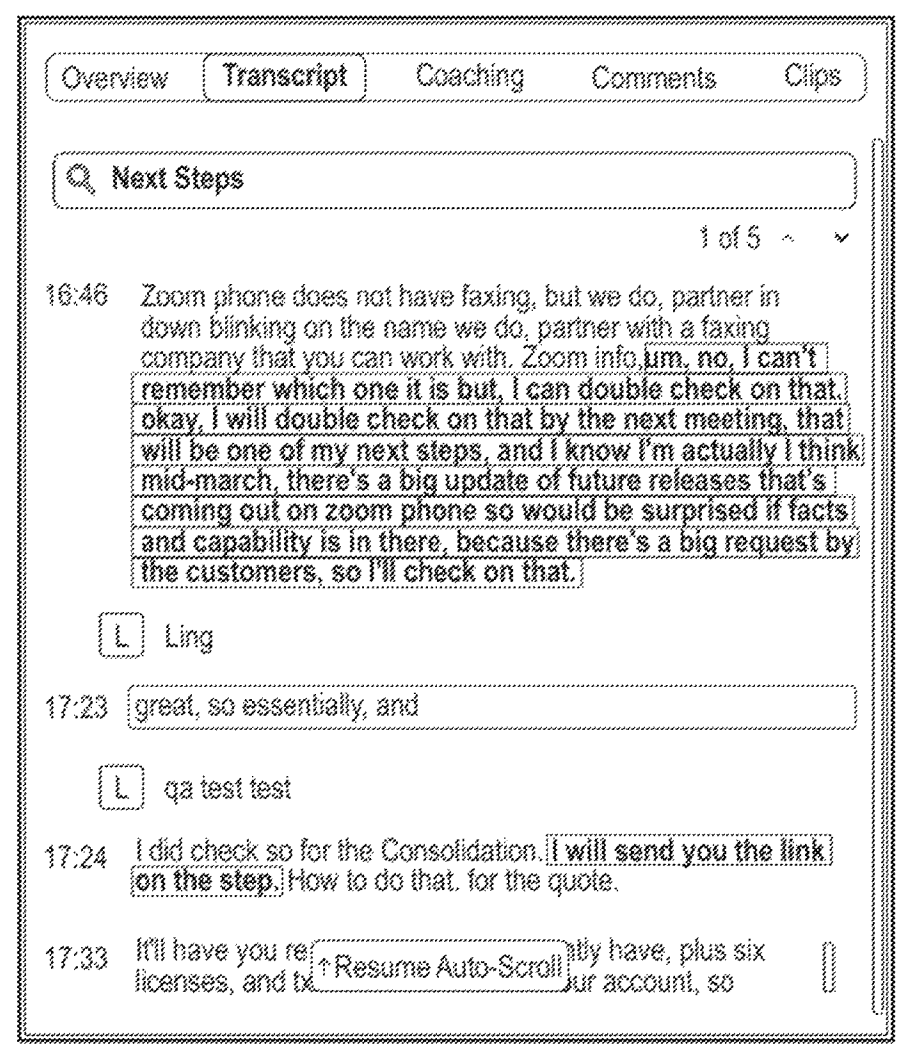

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, and instruct the UI to display the detected engaging questions asked within the transcript in a highlighted or similar fashion (e.g., the system may cause the client device to play back a recording of the video communication session and to display the transcript, wherein, during playback, sentences of the transcript corresponding to engaging questions are highlighted as their corresponding portions of the recording are played back). An example of such a UI is illustrated in FIG. 6, described in further detail below. In some embodiments, a UI element with a playback recording may present one or more pieces of aggregate analytics data or individual analytics data corresponding to the communication session as a whole, the particular topic segment the user is playing back, or any other suitable data which can be presented. An example of such a UI element is illustrated in FIG. 4, described in further detail below.

FIG. 3 is a diagram illustrating one example embodiment of a user interface ("UI") for presenting data related to extracted engaging questions.

Within the illustrated UI, an analytics tab is presented at a display of a client device. A "Conversation" sub-tab is displayed with a number of analytics and metrics related to an aggregate of multiple conversations which participants have participated in within communication sessions for a sales team. One of the analytics elements which can be further navigated to is labeled "Engaging Questions", which is currently selected for display within the UI window. This set of analytics data shown includes per-participant information on the count of different engaging questions asked in conversations.

In the example, Jane Cooper has asked an average of 6 engaging questions within multiple conversations analyzed, Wade Warren has asked 5 engaging questions, and on the low end, Jacob Jones has uttered an average of less than 1 engaging question per conversation.

Additionally, filters appear above the data which allow for filtering conversations based on time and team. In this example, conversations from last month are included in the time filter, while the participant's team name is used for the team for which analytics data is displayed. Additional advanced filters may be applied via a drop down box UI element, if desired.

FIG. 4 is a diagram illustrating one example embodiment of a user interface for presenting data on engaging questions for a conversation.

Within the illustrated UI, a "Recordings" tab is presented at a display of a client device. Information about a specific recording of a communication session is displayed, including a video of the recording itself which can be played back in various ways or adjusted to skip to different times or topics within the video. A timeline allows the user to skip to different topic, and when the user hovers over a topic, a timestamp as well as a topic segment name is displayed.

On the right side of the window, a number of aggregate analytics data and/or metrics for the entire sales team are displayed with respect to the one, specific recording and communication session, including a "Engaging Questions" metric for the entire team. The Engaging Questions metric shows the data for the entire team in terms of average engaging questions asked during conversations, which in this example is 7. Next to this data, an icon with a checkmark is displayed, indicating that this average number of engaging questions used per minute has satisfied a recommended average number of engaging questions per minute. In some embodiments, the recommended number is predetermined and fixed, while in other embodiments, the recommended number may be based on one or more recommendation criteria, such as the past performance of the team, recommended performances for the industry, an aggregate recommended performance for the combination of participants involved based on individual participant recommended performances, or any other such suitable criteria for generating a recommended figure for the metric.

Directly below the video playback UI element, a list of participants is shown for a particular topic segment, with data relating to each. The information presented for each participant, as well as the order of participants, may change based on the topic segment currently being played or currently skipped to. In some embodiments, a user may be able to click on his own name from this list, or potentially other participants, to receive individualized and/or customized analytics data pertaining to him or her in particular. For example, the engaging questions used per minute for just that participant may be displayed, or both the individual data for that participant as well as the aggregate data so that the participant can compare their own performance with respect to the total sales team involved in the conversation.

In some embodiments, this UI for the recording may additionally or alternatively show such metrics, including the "Engaging Questions" individual or aggregate data, for a particular topic within the conversation, depending on where in the video recording the participant has skipped to or is currently playing back. For example, if the user skips to timestamp 04:12 in the recording, which is labeled with topic segment "Pricing Discussion", then the UI may additionally or alternatively show the number of engaging questions per minute used that is calculated for that topic segment alone. In this way, users, e.g., sales teams and their individual sales representatives, can view analytics data on their performance for each individual topic, not just as a whole for the recording or across multiple conversations. This can be useful, for example, if a sales representative learns via the data that they use engaging questions relatively rarely during a description or pitch of a product, but introduce more engaging questions during a pricing discussion, which may introduce a negative effect on customer sentiment during the part of the conversation when pricing is discussed. The participant may then be able to correct this to lower the number of engaging questions used in the pricing discussion, thus improving his or her sales performance and leading to better sales results.

FIG. 5 is a diagram illustrating examples of engaging questions extracted from a transcript for a conversation.

The illustration shows a chart with 17 examples (0-16) of engaging questions that were detected within an example of a transcript produced for a communication session. Each of the examples shows the engaging question itself, as well as a portion of the sentence with the engaging question used in a larger context of that portion. The first two engaging questions, in rows 0 and 1, both read "I mean". The first is a use of the engaging question mid-sentence ("But then <I mean>, they made up for it.") while the second is a use of the engaging question at the beginning of a sentence ("<I mean>, I I can't really make fun of"). Although not detected or treated as an engaging question, the two "I"s in the preceding example may indicate that the second of the "I"s is redundant and, in some embodiments, may be included within the list.

Other examples of engaging questions shown include several instances of "like", additional instances of "I mean", one instance of "so yeah", and two instances of "oh".

FIG. 6 is a diagram illustrating one example embodiment of a user interface presenting highlighted sections of engaging questions within a transcript of a conversation.

In the illustrated screenshot, a UI window is shown which presents a transcript of a conversation which is or has been held for a communication session. In some embodiments, the transcript is retrieved from an existing database or repository of transcripts. In some embodiments, the system generates the transcript based on an audio recording of the conversation between participants, using one or more transcription techniques such as, e.g., automatic speech recognition.

In a search field near the top of the window, a user has entered "Engaging questions" into the text field. The search engine element recognizes that the user wishes to see extracted engaging questions for the conversation which were extracted via the method described with respect to FIG. 2, and responds by highlighting, within the transcript, all extracted engaging questions that have been detected by the system. In some embodiments, the system retrieves all engaging questions from a repository and matches them to their place in the transcript as a whole, then presents them as highlighted within the transcript. In the illustrated example, at timestamp 11:02, the transcript reads, "So I know you mentioned wanting to have like group chats." In this sentence, "like" is highlighted as an engaging question, since it functions as a placeholder or pause in the sentence. The user can scroll through the entirety of the transcript at will, and view other highlighted engaging questions. The user can also enter other search terms into the search field, and other words may become highlighted rather than the engaging questions.

Figure 7:
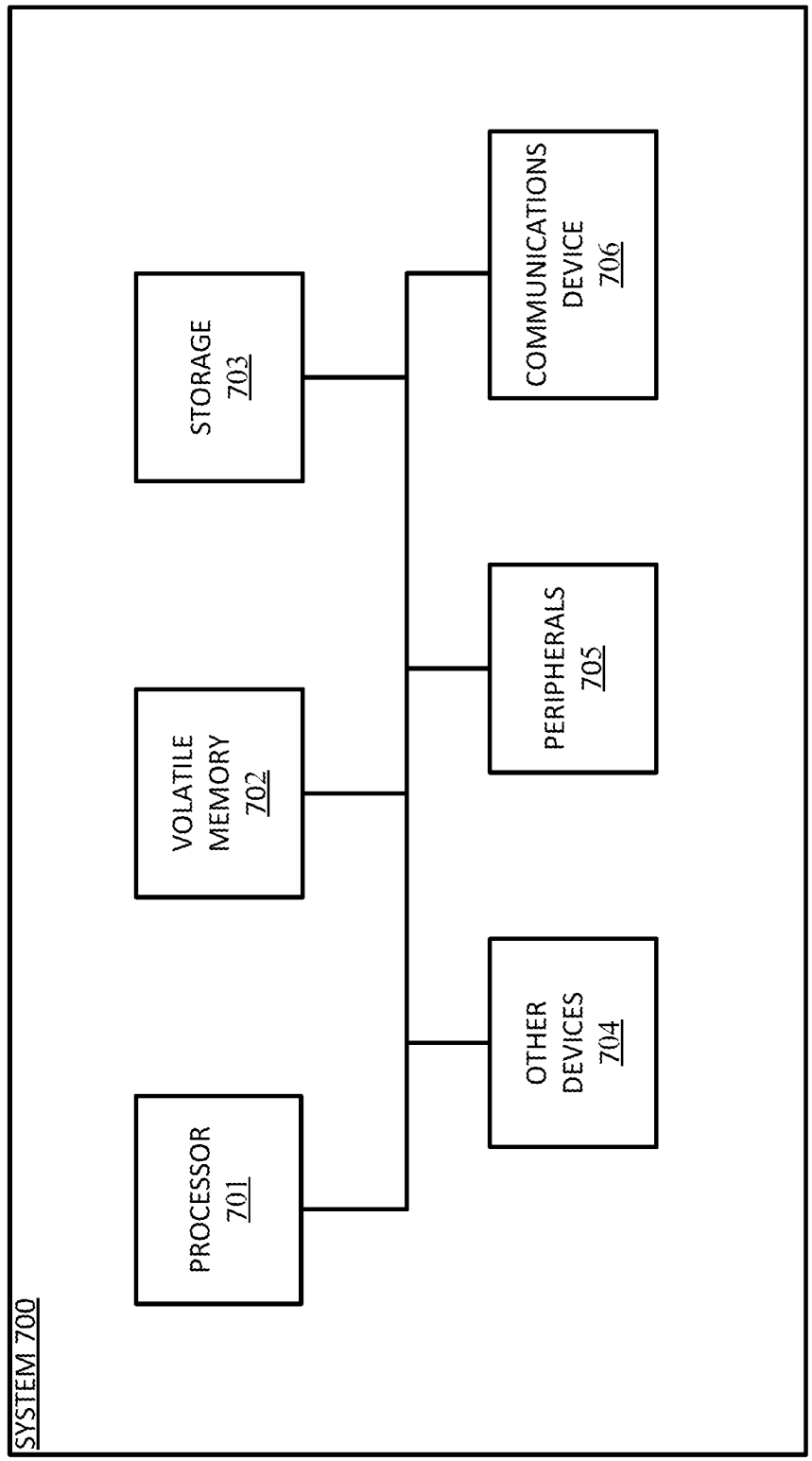
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 100 may also include a variety of other devices 704. The various components of the computer 700 may be connected by a connection medium such as a bus, crossbar, or network.

It will be appreciated that the present disclosure may include any one and up to all of the following examples.

Example 1. A method, comprising: connecting to a communication session involving one or more participants; receiving a transcript of a conversation between the participants produced during the communication session; extracting, from the transcript, a plurality of utterances comprising one or more sentences spoken by the participants; identifying a subset of the plurality of utterances spoken by a subset of the participants associated with a prespecified organization; extracting one or more engaging questions within the subset of utterances, the engaging questions each comprising a question asked by the participant associated with the organization that is answered in the following utterance by a participant not associated with the organization; and presenting, for display to one or more users, data corresponding to the extracted engaging questions.

Example 2. The method of example 1, wherein extracting the one or more engaging questions within the subset of utterances comprises: determining that one or more words within an utterance are interrogative words which call for more specific information.

Example 3. The method of any of examples 1-2, wherein the interrogative words each comprise one of: "who", "what", "when", "where", or "how".

Example 4. The method of any of examples 1-3, wherein extracting the one or more engaging questions within the subset of utterances comprises: determining that one or more words within an utterance constitute a polar question which can be answered in the affirmative or in the negative.

Example 5. The method of any of examples 1-4, wherein extracting the one or more engaging questions within the subset of utterances comprises: determining the syntactic structure of each sentence in an utterance by tagging and parsing tokens of speech within the sentence.

Example 6. The method of any of examples 1-5, wherein extracting the one or more engaging questions within the subset of utterances further comprises: determining that one or more words within an utterance constitute a pied-piping sentence with a prepositional dependency relationship between an interrogative word and its syntactic parent.

Example 7. The method of example 6, wherein extracting the one or more engaging questions within the subset of utterances further comprises: determining that one or more words within an utterance constitute a pseudocleft in which an interrogative word is used for emphasis rather than interrogation; and labeling the utterance as a false positive not to be extracted as an engaging question.

Example 8. The method of any of examples 1-7, wherein presenting the data for display at the one or more client devices comprises: presenting the transcript of the conversation with highlighted sections comprising the one or more engaging questions.

Example 9. The method of any of examples 1-8, further comprising: determining a set of analytics data corresponding to the extracted engaging questions and the participants associated with speaking them, presenting the data for display at the one or more client devices comprising: presenting at least a subset of the analytics data corresponding to the extracted engaging questions.

Example 10. The method of example 9, wherein at least a portion of the set of analytics data comprises a calculation of the average number of engaging questions extracted within a plurality of communication sessions for each participant associated with the organization.

Example 11. The method of any of examples 1-10, further comprising: training one or more artificial intelligence (AI) models to extract engaging questions in communication sessions, extracting the one or more engaging questions within the subset of the utterances being performed by the one or more AI models.

Example 12. The method of example 11, wherein at least a subset of the one or more AI models are trained to extract engaging questions in a plurality of languages.

Example 13. The method of any of examples 1-12, wherein the transcript of the conversation is generated via one or more automatic speech recognition (ASR) techniques.

Example 14. The method of any of examples 1-13, wherein: the communication session is a sales session with one or more prospective customers, the prespecified organization is a sales team, and the presented data relates to one or more performance metrics for the sales team.

Example 15. The method of any of examples 1-14, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 16. The method of example 15, wherein the one or more processors are further configured to perform the operations of: identifying a plurality of linguistic features within each sentence of the utterance, the linguistic features comprising at least parts of speech within the sentence; and labeling each of the words as a part of speech within their respective sentences, one or more rules for extracting engaging questions being based on the labeled parts of speech for words in the sentences.

Example 17. The method of example 16, wherein the linguistic features comprise one or more of: words or tokens, lemmas, parts of speech (POS), detailed POS tags, dependencies, word shapes, alpha characters, morphology, and/or words in a stop list.

Example 18. The method of any of examples 1-17, further comprising: receiving audio and/or video data of the participants speaking during the communication session, extracting engaging questions being performed in part from analyzing one or more of voice pitch data, facial expressions, and distribution of pauses in the audio and/or video data from the participants speaking during the communication session.

Example 19. A communication system comprising one or more processors configured to perform the operations of: connecting to a communication session involving one or more participants; receiving a transcript of a conversation between the participants produced during the communication session; extracting, from the transcript, a plurality of utterances comprising one or more sentences spoken by the participants; identifying a subset of the plurality of utterances spoken by a subset of the participants associated with a prespecified organization; extracting one or more engaging questions within the subset of utterances, the engaging questions each comprising a question asked by the participant associated with the organization that is answered in the following utterance by a participant not associated with the organization; and presenting, for display to one or more users, data corresponding to the extracted engaging questions.

Example 20. The communication system of example 19, wherein the one or more processors are further configured to perform the operations of: identifying a plurality of linguistic features within each sentence of the utterance, the linguistic features comprising at least parts of speech within the sentence; and labeling each of the words as a part of speech within their respective sentences, one or more rules for extracting engaging questions being based on the labeled parts of speech for words in the sentences.

Example 21. The communication system of any of examples 19-20, wherein the linguistic features comprise one or more of: words or tokens, lemmas, parts of speech (POS), detailed POS tags, dependencies, word shapes, alpha characters, morphology, and/or words in a stop list.

Example 22. The communication system of any of examples 19-21, further comprising: receiving audio and/or video data of the participants speaking during the communication session, extracting engaging questions being performed in part from analyzing one or more of voice pitch data, facial expressions, and distribution of pauses in the audio and/or video data from the participants speaking during the communication session.

Example 23. The communication system of any of examples 19-22, wherein extracting the one or more engaging questions within the subset of utterances comprises: determining that one or more words within an utterance are interrogative words which call for more specific information.

Example 24. The communication system of any of examples 19-23, wherein the interrogative words each comprise one of: "who", "what", "when", "where", or "how".

Example 25. The communication system of any of examples 19-24, wherein extracting the one or more engaging questions within the subset of utterances comprises: determining that one or more words within an utterance constitute a polar question which can be answered in the affirmative or in the negative.

Example 26. The communication system of any of examples 19-25, wherein extracting the one or more engaging questions within the subset of utterances comprises: determining the syntactic structure of each sentence in an utterance by tagging and parsing tokens of speech within the sentence.

Example 27. The communication system of any of examples 19-26, wherein extracting the one or more engaging questions within the subset of utterances further comprises: determining that one or more words within an utterance constitute a pied-piping sentence with a prepositional dependency relationship between an interrogative word and its syntactic parent.

Example 28. The communication system hod of example 27, wherein extracting the one or more engaging questions within the subset of utterances further comprises: determining that one or more words within an utterance constitute a pseudocleft in which an interrogative word is used for emphasis rather than interrogation; and labeling the utterance as a false positive not to be extracted as an engaging question.

Example 29. The communication system of any of examples 19-28, wherein presenting the data for display at the one or more client devices comprises: presenting the transcript of the conversation with highlighted sections comprising the one or more engaging questions.

Example 30. The communication system of any of examples 19-29, further comprising: determining a set of analytics data corresponding to the extracted engaging questions and the participants associated with speaking them, presenting the data for display at the one or more client devices comprising: presenting at least a subset of the analytics data corresponding to the extracted engaging questions.

Example 31. The communication system of example 30, wherein at least a portion of the set of analytics data comprises a calculation of the average number of engaging questions extracted within a plurality of communication sessions for each participant associated with the organization.

Example 32. The communication system of any of examples 19-31, further comprising: training one or more artificial intelligence (AI) models to extract engaging questions in communication sessions, extracting the one or more engaging questions within the subset of the utterances being performed by the one or more AI models.

Example 33. The communication system of example 32, wherein at least a subset of the one or more AI models are trained to extract engaging questions in a plurality of languages.

Example 34. The communication system of any of examples 19-33, wherein the transcript of the conversation is generated via one or more automatic speech recognition (ASR) techniques.

Example 35. The communication system of any of examples 19-34, wherein: the communication session is a sales session with one or more prospective customers, the prespecified organization is a sales team, and the presented data relates to one or more performance metrics for the sales team.

Example 36. The communication system of any of examples 19-35, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 37. A non-transitory computer-readable medium containing instructions for generating a note with session content from a communication session, comprising: instructions for connecting to a communication session involving one or more participants; instructions for receiving a transcript of a conversation between the participants produced during the communication session; instructions for extracting, from the transcript, a plurality of utterances comprising one or more sentences spoken by the participants; instructions for identifying a subset of the plurality of utterances spoken by a subset of the participants associated with a prespecified organization; instructions for extracting one or more engaging questions within the subset of utterances, the engaging questions each comprising a question asked by the participant associated with the organization that is answered in the following utterance by a participant not associated with the organization; and instructions for presenting, for display to one or more users, data corresponding to the extracted engaging questions.

Example 38. The non-transitory computer-readable medium of example 37, wherein extracting the one or more engaging questions within the subset of utterances comprises: determining that one or more words within an utterance are interrogative words which call for more specific information.

Example 39. The non-transitory computer-readable medium of example 38, wherein the interrogative words each comprise one of: "who", "what", "when", "where", or "how".

Example 40. The non-transitory computer-readable medium of any of examples 37-39, wherein extracting the one or more engaging questions within the subset of utterances comprises: determining that one or more words within an utterance constitute a polar question which can be answered in the affirmative or in the negative.

Example 41. The non-transitory computer-readable medium of any of examples 37-40, wherein extracting the one or more engaging questions within the subset of utterances comprises: determining the syntactic structure of each sentence in an utterance by tagging and parsing tokens of speech within the sentence.

Example 42. The non-transitory computer-readable medium of example 41, wherein extracting the one or more engaging questions within the subset of utterances further comprises: determining that one or more words within an utterance constitute a pied-piping sentence with a prepositional dependency relationship between an interrogative word and its syntactic parent.

Example 43. The non-transitory computer-readable medium of any of examples 41-42, wherein extracting the one or more engaging questions within the subset of utterances further comprises: determining that one or more words within an utterance constitute a pseudocleft in which an interrogative word is used for emphasis rather than interrogation; and labeling the utterance as a false positive not to be extracted as an engaging question.

Example 44. The non-transitory computer-readable medium of any of examples 37-43, wherein presenting the data for display at the one or more client devices comprises: presenting the transcript of the conversation with highlighted sections comprising the one or more engaging questions.

Example 45. The non-transitory computer-readable medium of any of examples 37-44, further comprising: determining a set of analytics data corresponding to the extracted engaging questions and the participants associated with speaking them, presenting the data for display at the one or more client devices comprising: presenting at least a subset of the analytics data corresponding to the extracted engaging questions.

Example 46. The non-transitory computer-readable medium of any of examples 37-45, wherein at least a portion of the set of analytics data comprises a calculation of the average number of engaging questions extracted within a plurality of communication sessions for each participant associated with the organization.

Example 47. The non-transitory computer-readable medium of any of examples 37-46, further comprising: training one or more artificial intelligence (AI) models to extract engaging questions in communication sessions, extracting the one or more engaging questions within the subset of the utterances being performed by the one or more AI models.

Example 48. The non-transitory computer-readable medium of example 47, wherein at least a subset of the one or more AI models are trained to extract engaging questions in a plurality of languages.

Example 49. The non-transitory computer-readable medium of any of examples 37-48, wherein the transcript of the conversation is generated via one or more automatic speech recognition (ASR) techniques.

Example 50. The non-transitory computer-readable medium of any of examples 37-49, wherein: the communication session is a sales session with one or more prospective customers, the prespecified organization is a sales team, and the presented data relates to one or more performance metrics for the sales team.

Example 51. The non-transitory computer-readable medium of any of examples 37-50, wherein the one or more client devices presented with the data are one or more of: one or more participants of the communication session associated with the organization, one or more administrators or hosts of the communication session, one or more users within an organizational reporting chain of participants of the communication session, and/or one or more authorized users within the organization.

Example 52. The non-transitory computer-readable medium of example 51, wherein the one or more processors are further configured to perform the operations of: identifying a plurality of linguistic features within each sentence of the utterance, the linguistic features comprising at least parts of speech within the sentence; and labeling each of the words as a part of speech within their respective sentences, one or more rules for extracting engaging questions being based on the labeled parts of speech for words in the sentences.

Example 53. The non-transitory computer-readable medium of example 52, wherein the linguistic features comprise one or more of: words or tokens, lemmas, parts of speech (POS), detailed POS tags, dependencies, word shapes, alpha characters, morphology, and/or words in a stop list.

Example 54. The non-transitory computer-readable medium of any of examples 37-53, further comprising: receiving audio and/or video data of the participants speaking during the communication session, extracting engaging questions being performed in part from analyzing one or more of voice pitch data, facial expressions, and distribution of pauses in the audio and/or video data from the participants speaking during the communication session.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
    providing, by a video communication platform, a video communication session between a first participant and a first group of participants;
    identifying, for each of the first participant and the first group of participants, an organization associated with each participant based on credentials used by each participant to access the video communication session, wherein the first participant is associated with a first organization that none of the first group of participants are associated with;
    obtaining a transcript of a conversation between the first participant and the first group of participants produced during the video communication session;
    attaching a timestamp and a speaker identification to each utterance and to each sentence within the transcript;
    extracting, from the transcript using the timestamps and speaker identifications, a plurality of utterances comprising one or more sentences spoken by the first participant;
    extracting, from the one or more sentences using the timestamps and speaker identifications, one or more questions asked by the first participant that are answered in a following utterance by one participant of the first group of participants;
    labeling the one or more questions asked by the first participant that are answered in the following utterance by the one participant of the first group of participants as engaging questions;
    sending, by the communication platform to a client device of at least one participant, data corresponding to the engaging questions, wherein the data includes a timeline that provides a timestamp for each engaging question and a topic segment name, wherein the data shows a number of engaging questions per minute for each topic segment name for each participant, and wherein the data includes the transcript with all engaging questions highlighted; and
    causing a client device of at least one participant to play back a recording of the video communication session and to display the transcript, wherein, during playback, sentences of the transcript corresponding to engaging questions are highlighted as their corresponding portions of the recording are played back.

2. The method of claim 1, wherein a question of the one or more questions is labeled as an engaging question when it is determined that one or more words within the question are interrogative words which call for more specific information.

3. The method of claim 2, wherein the interrogative words each comprise one of: "who", "what", "when", "where", or "how".

4. The method of claim 1, wherein a question of the one or more questions is labeled as an engaging question when it is determined that one or more words within the question constitute a polar question which can be answered with a yes or a no.

5. The method of claim 1, wherein extracting the one or more questions within the one or more sentences comprises:
    determining a syntactic structure of each sentence of the one or more sentences by tagging and parsing tokens of speech within the sentence.

6. The method of claim 5, wherein extracting the one or more questions within the one or more sentences further comprises:
    determining that one or more words within the sentence constitute a pied-piping sentence with a prepositional dependency relationship between an interrogative word and its syntactic parent.

7. The method of claim 5, wherein extracting the one or more questions within the one or more sentences further comprises:
    determining that one or more words within a sentence constitute a pseudocleft in which an interrogative word is used for emphasis rather than interrogation; and
    labeling the utterance as a false positive not to be extracted as a question.

8. The method of claim 1, further comprising:
    determining a set of analytics data corresponding to the engaging questions; and
    presenting at least a subset of the analytics data corresponding to the engaging questions.

9. The method of claim 8, wherein at least a portion of the set of analytics data comprises a calculation of an average number of engaging questions within a plurality of communication sessions for each participant associated with the first organization.

10. The method of claim 1, further comprising:
    training one or more artificial intelligence (AI) models to label engaging questions in communication sessions, wherein
    labeling the one or more questions as engaging questions is performed by the one or more AI models.

11. The method of claim 10, wherein at least a subset of the one or more AI models are trained to label engaging questions in a plurality of languages.

12. The method of claim 1, wherein the transcript of the conversation is generated via one or more automatic speech recognition (ASR) techniques.

13. The method of claim 1, wherein:
the video communication session is a sales session with one or more prospective customers,
the first organization is a sales team, and
the data relates to one or more performance metrics for the sales team.

14. The method of claim 1, wherein data corresponding to the engaging questions is presented to one or more of: one or more participants of the video communication session associated with the first organization, one or more administrators or hosts of the video communication session, one or more users within an organizational reporting chain of participants of the video communication session, and/or one or more authorized users within the first organization.

15. A communication system comprising one or more processors configured to perform operations of:
providing, by a video communication platform, a video communication session between a first participant and a first group of participants;
identifying, for each of the first participant and the first group of participants, an organization associated with each participant based on credentials used by each participant to access the video communication session, wherein the first participant is associated with a first organization that none of the first group of participants are associated with;
obtaining a transcript of a conversation between the first participant and the first group of participants produced during the video communication session;
extracting, from the transcript, a plurality of utterances comprising one or more sentences spoken by the first participant;
attaching a timestamp and a speaker identification to each utterance and to each sentence within the transcript;
extracting, from the one or more sentences using the timestamps and speaker identifications, one or more questions asked by the first participant that are answered in a following utterance by one participant of the first group of participants;
labeling the one or more questions asked by the first participant that are answered in the following utterance by the one participant of the first group of participants as engaging questions;
sending, by the communication platform to a client device of at least one participant, data corresponding to the engaging questions, wherein the data includes a timeline that provides a timestamp for each engaging question and a topic segment name, wherein the data shows a number of engaging questions per minute for each topic segment name for each participant, and wherein the data includes the transcript with all engaging questions highlighted; and
causing a client device of at least one participant to play back a recording of the video communication session and to display the transcript, wherein, during playback, sentences of the transcript corresponding to engaging questions are highlighted as their corresponding portions of the recording are played back.

16. The communication system of claim 15, wherein the one or more processors are further configured to perform the operations of:
identifying a plurality of linguistic features within each sentence of the one or more sentences, the linguistic features comprising at least parts of speech within the sentence; and
labeling each word of each sentence as a part of speech within their respective sentences, wherein one or more rules for labeling questions as engaging questions are based on the labeled parts of speech for words in the one or more sentences.

17. The communication system of claim 16, wherein the linguistic features comprise one or more of: words or tokens, lemmas, parts of speech (POS), detailed POS tags, dependencies, word shapes, alpha characters, morphology, and/or words in a stop list.

18. The communication system of claim 15, further comprising:
receiving audio and/or video data of the participants speaking during the video communication session,
wherein questions are labeled as engaging questions in part from analyzing one or more of voice pitch data, facial expressions, and distribution of pauses in the audio and/or video data from the participants during the video communication session.

19. A non-transitory computer-readable medium containing instructions for generating labeling questions as engaging questions, comprising:
instructions for providing, by a video communication platform, a video communication session between a first participant and a first group of participants;
instructions for identifying, for each of the first participant and the first group of participants, an organization associated with each participant based on credentials used by each participant to access the video communication session, wherein the first participant is associated with a first organization that none of the first group of participants are associated with;
instructions for obtaining a transcript of a conversation between the first participant and the first group of participants produced during the video communication session;
instructions for attaching a timestamp and a speaker identification to each utterance and to each sentence within the transcript;
instructions for extracting, from the transcript, a plurality of utterances comprising one or more sentences spoken by the first participant;
instructions for extracting, from the one or more sentences using the timestamps and speaker identifications, one or more questions asked by the first participant that are answered in a following utterance by one participant of the first group of participants;
instructions for labeling the one or more questions asked by the first participant that are answered in the following utterance by the one participant of the first group of participants as engaging questions;
instructions for sending, by the communication platform to a client device of at least one participant, data corresponding to the engaging questions, wherein the data includes a timeline that provides a timestamp for each engaging question and a topic segment name, wherein the data shows a number of engaging questions per minute for each topic segment name for each participant, and wherein the data includes the transcript with all engaging questions highlighted; and
instructions for causing a client device of at least one participant to play back a recording of the video communication session and to display the transcript, wherein, during playback, sentences of the transcript corresponding to engaging questions are highlighted as their corresponding portions of the recording are played back.

* * * * *